Patented Feb. 14, 1950

2,497,060

UNITED STATES PATENT OFFICE 2,497,060

3,5-DIHALOGEN-2-CYANODIPHENYLS

Saul R. Buc, Easton, Pa., assignor to General Aniline & Film Corporation, New York, N. Y., a corporation of Delaware No Drawing. Application December 31, 1948,
Serial No. 68,733

3 Claims. (Cl. 260—465)

This invention relates to new aromatic dihalogen mononitriles.

The compounds of my invention are members of a hitherto unknown class of diphenyl compounds. They are characterized by containing on the one nucleus of the diphenyl group a single nitrile group and a pair of identical halogen atoms, the halogen atoms being located, respectively, in the ortho and para positions to the nitrile group. The halogen atoms may be chlorine or bromine.

The new compounds are 3,5-dichloro-2-cyanodiphenyl and 3,5-dibromo-2-cyanodiphenyl and are comprised under the general formula:

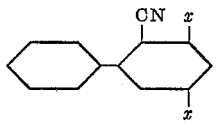

wherein $x$ represents identical halogen atoms which, as previously mentioned, may be chlorine or bromine. They are valuable intermediates for the synthesis of organic compounds and find a particular application in the preparation of certain tetracyano-phenyl substituted copper phthalocyanines.

The preparation of the new dihalogen mononitriles can be accomplished by diazotising the corresponding 3,5-dihalogen-2-aminodiphenyls (hydrochloride salt) and subjecting the resulting diazonium salt in known way to the Sandmeyer reaction for displacement of the amino group by the cyano group. The diazotisation of the aminodiphenyl compound is carried out with a slight excess of the sodium nitrite, for example, 10% excess. A weakly acid diazo solution is obtained by adding glacial acetic acid and subsequently neutralizing the mineral acid present (HCl) with sodium carbonate. The weakly acid diazo solution is then added to a boiling aqueous solution of cuprous cyanide, sodium cyanide and glacial acetic acid. The crude mononitrile separates at once. It is collected by filtration and after washing with water, is washed free from cuprous salts by boiling with an aqueous solution of sodium cyanide. After filtering and drying, it may be purified by distilling under reduced pressure or by repeated crystallization from a suitable solvent, such as isopropanol or butanol.

The starting 3,5-dihalogen-2-aminodiphenyls are known compounds and can be obtained by the method of Scarborough and Waters, J. Chem. Soc. (1927), 95.

The preparation of the new compounds is illustrated in a more specific manner by the following examples.

EXAMPLE 1

3,5-dichloro-2-cyanodiphenyl 54.9 grams (0.2 mol.) of 3,5-dichloro-2-aminodiphenyl hydrochloride was suspended by stirring in 200 mls. of 20% hydrochloric acid. The suspension was cooled to 10° C. and diazotised in the usual way by the addition of 51 mls. (10% excess) of 30% aqueous sodium nitrite solution. The halogenated amine hydrochloride dissolved on diazotisation. To the diazo solution was added 25 mls. of glacial acetic acid and the hydrochloric acid neutralized by the addition of 280 mls. of 20% aqueous sodium carbonate solution. The weakly acid diazo solution thus prepared was added to a boiling solution of; 18 grams of cuprous cyanide, 20 grams of sodium cyanide and 25 mls. of glacial acetic acid in 500 mls. of water. The formed nitrile separated at once. It was filtered, washed with water and then washed free from cuprous salts by boiling with an aqueous solution of sodium cyanide. The product was filtered, dried by warming and distilled at reduced pressure. At 13 mm. it boiled at 198–200° C. The yield was 56%. A sample recrystallized from butanol melted at 149–150° C.

EXAMPLE 2

3,5-dibromo-2-cyanodiphenyl

This compound was prepared in the manner of the previous example starting with the 3,5-dibromo-2-aminodiphenyl hydrochloride. The product was purified by repeated crystallization from isopropanol instead of by distillation. The purified product had a melting point of 155–156° C.

I claim:

1. A diphenyl dihalogen mononitrile of the general formula:

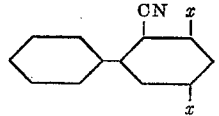

wherein $x$ represents identical halogen atoms selected from the group consisting of the chlorine and bromine atoms.

2. As a new compound, 3,5-dichloro-2-cyanodiphenyl.

3. As a new compound, 3,5-dibromo-2-cyanodiphenyl.

SAUL R. BUC.

No references cited.